United States Patent

[11] 3,611,878

[72] Inventor Louis M. Puster
 Knoxville, Tenn.
[21] Appl. No. 865,041
[22] Filed Oct. 9, 1969
[45] Patented Oct. 12, 1971
[73] Assignee Robertshaw Controls Company
 Richmond, Va.

[54] ELECTRICALLY OPERATED VALVE MEANS
 18 Claims, 10 Drawing Figs.
[52] U.S. Cl. .................................................. 91/459,
 137/625.65, 251/138
[51] Int. Cl. ............................................. F15b 13/044,
 F16k 31/06
[50] Field of Search ............................................. 137/625.65;
 251/138; 91/459

[56] References Cited
 UNITED STATES PATENTS

| | | | |
|---|---|---|---|
| 691,692 | 1/1902 | Zweigbergk | 91/459 X |
| 2,148,703 | 2/1939 | Martin | 137/625.65 |
| 2,296,132 | 9/1942 | Wisely | 251/138 X |
| 2,336,887 | 12/1943 | Piron | 91/459 X |
| 2,850,258 | 9/1958 | Lazich | 251/38 X |
| 3,176,516 | 4/1965 | Guenther | 251/138 X |
| 3,229,588 | 1/1966 | Czernek | 137/625.65 X |
| 3,254,675 | 6/1966 | Johnson | 137/625.65 |

FOREIGN PATENTS
842,238 7/1960 Great Britain ................ 137/625.65

*Primary Examiner*—Martin P. Schwadron
*Assistant Examiner*—Irwin C. Cohen
*Attorneys*—Auzville Jackson, Jr., Robert L. Marben and Candor, Candor & Tassone ABSTRACT: A plurality of separate pneumatically operated actuators disposed in aligned and abutting relation to provide a linear positioning unit having opposed ends with each actuator being individually operable to linearly extend itself when actuated and thereafter to linearly collapse itself when deactuated whereby one end of the unit will be correspondingly linearly extended relative to the other end thereof and thereafter be linearly collapsed relative to the other end thereof. A control device being operatively interconnected to the one end of the positioning unit to be controlled in relation to the position of the one end relative to the other end thereof and electrically operated ball valve means including opposed valve seats and shock-absorbing spring means for directing a source of pneumatic fluid to at least one of the actuators to extend the one end of the unit by the degree of actuation of the one actuator and for thereafter disconnecting the source from that one actuator to collapse the one end of the unit by the degree of deactuation of the one actuator.

INVENTOR.
LOUIS M. PUSTER

HIS ATTORNEYS

INVENTOR.
LOUIS M. PUSTER

INVENTOR.
LOUIS M. PUSTER

ELECTRICALLY OPERATED VALVE MEANS

This invention relates to an improved electrically operated valve means.

It is well known that various pneumatically operated positioning devices have been provided wherein a controlled device has its operating condition changed in proportion to the degree of actuation of one or more pneumatically operated actuators forming part of the positioning apparatus.

It is a feature of this invention to provide an improved electrically operated valve means for such a pneumatically operated positioning apparatus or the like.

In particular, one embodiment of this invention provides a tubular housing member having a plurality of separate pneumatically operated actuators disposed in aligned and abutting relation in a tubular housing to provide a linear positioning unit having opposed ends, each actuator being individually operable to readily extend itself when actuated and thereafter to linearly collapse itself when deactuated whereby one end of the unit will be correspondingly linearly extended relative to the other end thereof and thereafter be linearly collapsed relative to the other end thereof. A control device is operatively interconnected to the one end of the positioning unit to be controlled in relation to the position of the end of the unit relative to the other end thereof. A source of pneumatic fluid is directed to a control means which comprises individual solenoid-operated valves for each of the pneumatically operated actuators whereby when one of the solenoid-operated valves directs the pneumatic source to its respective actuator to extend the one end of the unit by the degree of actuation of that one actuator, the control device is proportionally adjusted.

Therefore, it is an object of this invention to provide an improved electrically operated valve means.

Another object of this invention is to provide an improved system utilizing such valve means.

Other objects, uses and advantages of this invention are apparent from a reading of this description which proceeds with reference to the accompanying drawings forming a part thereof and wherein:

While the various features of this invention are hereinafter described and illustrated as being particularly adapted to provide electrically operated valve means for a positioning apparatus, it is to be understood that the various features of this invention can be utilized singly or in any combination thereof to provide valve means for other devices as desired.

Therefore, this invention is not to be limited to only the embodiment illustrated in the drawings, because the drawings are merely utilized to illustrate one of the wide variety of uses of this invention.

Figures 1, 2:
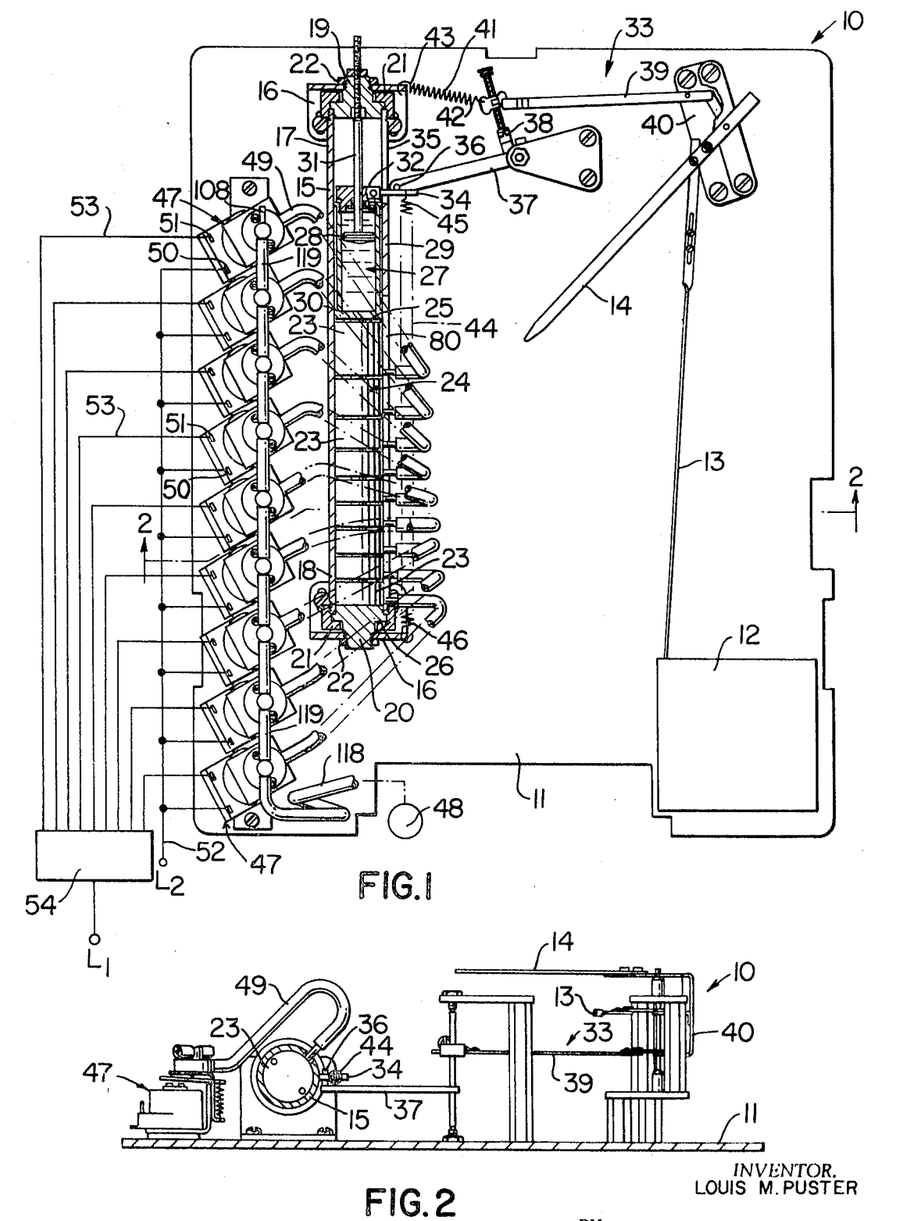
FIG. 1 is a side view, partially in cross section, illustrating the improved pneumatically operated positioning apparatus and control system of this invention.
FIG. 2 is a cross-sectional view taken substantially on line 2—2 of FIG. 1.

Referring now to FIGS. 1 and 2, the improved pneumatically operated positioning apparatus and control system of this invention is generally indicated by the reference numeral 10 and comprises a frame means 11 carrying a device 12 that is adapted to have its output varied in relation to the position of an actuator rod 13 relative to the frame 11, the actuator rod 13 being suitably coupled to an indicating pointer 14 which indicates to the viewer the position of the actuator rod 13 and, thus, the set output function of the control device 12.

A cylindrical housing means 15 is secured to the frame means 11 in any suitable manner, such as by brackets 16 respectively at the opposed ends 17 and 18 of the cylinder 15. The opposed ends 17 and 18 of the cylinder 15 are respectively closed by end closure caps 19 and 20 held thereon in plug fashion by threaded retainers 21 respectively threaded to the externally threaded ends 17 and 18 of the cylinder 15, the end closures 19 and 20 respectively having externally threaded extensions projecting through suitable openings in the brackets 16 to receive nuts 22 to thereby fasten the sleeve or cylinder 15 to the frame means 11.

A plurality of separate pneumatically operated actuators 23 are respectively disposed in stacked aligned relation in the cylinder 15 with the bottom actuator 23 resting against the lower end cap 20 whereby such actuators 23 are disposed in aligned abutting relation to provide a linear positioning unit, generally indicated by the reference numeral 24, in the cylinder 15 with the positioning unit having opposed ends 25 and 26.

A dashpot means, generally indicated by the reference numeral 27 in FIG. 1, is also disposed in the cylinder or housing means 15 and comprises a piston 28 and cooperating cylinder 29 with the cylinder 29 being movable in the housing 15 and having its lower end 30 abutting against the upper end 25 of the positioning unit 24. The piston 28 is held stationary relative to the cylinder 29 and has a stem 31 projecting out of the upper end 32 of the cylinder 29 and is threadedly interconnected to the upper end cap 19 of the housing means 15 whereby the position of the piston 28 can be adjusted relative to the housing means 15, if desired.

The cylinder 29 of the dashpot means 27 is filled with a suitable dampening fluid, such as silicone, so as to provide means for cushioning linear movement of the positioning unit 24 in the housing means 15 to the actuator rod 13 of the control device 12 as will be apparent hereinafter, the dashpot means 27 operatively interconnecting the positioning unit 24 to the actuating rod 13 of the control device 12 by suitable linkage means 33.

In particular, the upper end 32 of the cylinder 29 of the dashpot means 27 has an arm 34 fastened therethrough and projecting out through a slot 35 in the housing means 15 so as to be disposed in engagement with a pin 36 transversely carried by a pivotally mounted lever 37 which is interconnected through linkage means 38, 39 and 40 to the actuator rod 13 and set point indicator 14 so that upward and downward movement of the arm 34 of the dashpot means 27 will cause correspondingly downward and upward movement of the actuating rod 13 as will be apparent hereinafter. In order to maintain the pin 36 of the lever 37 in engagement against the arm 34 of the dashpot means 27, a suitable tension spring 41 is provided and has one end 42 interconnected to the link 38 and the other end 43 thereof interconnected to the upper bracket 16.

Since the actuators 23 of the positioning unit 24 are separate from each other, as well as from the dashpot means 27 in the housing means 15, another tension spring 44 is provided and has one end 45 interconnected to the arm 34 and the other end 46 thereof interconnected to the lower bracket 16 whereby the force of the tension spring 44 normally tends to maintain all of the actuators 23 in their collapsed and deactuated condition and with the cylinder 29 of the dashpot means 27 in engagement with the upper end 25 of the positioning unit 24.

Each actuator 23 of the positioning unit 24 is adapted to be individually operable to linearly extend itself when actuated and thereafter to linearly collapse itself when deactuated whereby the upper end 25 of the positioning unit 24 will be correspondingly linearly extended in an upward direction and thereafter be linearly collapsed in a downward direction depending upon the degree of actuation of the particular actuator 23 and the degree of deactuation thereof. Since such upward and downward movement of the upper end 25 of the positioning unit 24 operates to correspondingly move the cylinder 29 of the dashpot means 27, the dampening fluid in the cylinder 29 serves to dampen such movement of the upper end 25 of the positioning unit 24 to the actuating rod 13 of the control device 12 so that the control device 12 is slowly changed and thereby does not have sudden overshoots or undershoots, the pin 36 sliding on the arm 34 of the cylinder 29 of the dashpot means 27 so as to permit clockwise or counterclockwise movement of the lever 37 depending upon upward of downward movement of the end 25 of the positioning unit 24.

A plurality of electrically operated valve means 47 are respectively secured to the frame means 11 with one valve means 47 being provided for each pneumatically operated actuator 23 which, in the embodiment illustrated in FIG. 1, comprises nine valve means 47 and nine pneumatically operated actuators 23. Each valve means 47 is operatively interconnected to a pneumatic source 48 in a manner hereinafter described and is adapted, when actuated, to direct the pneumatic source 48 to its respective actuator 23 by an outlet conduit means 49 so as to linearly extend or actuate that actuator 23. Thereafter, that particular valve means 47 can disconnect the pneumatic source 48 from its respective actuator 23 while interconnecting the atmosphere thereto so as to deactuate its particular actuator 23 whereby the same will linearly collapse under the force of the tension spring 44.

Each valve means 47, when deenergized, prevents communication between the pneumatic source 48 and its respective actuator 23 while interconnecting its respective actuator 23 to the atmosphere. However, when the respective valve means 47 is energized, the same disconnects the atmosphere from its respective actuator 23 and interconnects the pneumatic source 48 thereto.

Each valve means 47 has a pair of terminals 50 and 51 with the terminals 50 of the valve means 47 being respectively interconnected to an electrical lead 52 that is interconnected to a power source line $L_2$. The other terminal 51 of each valve means 47 is interconnected to respective leads 53 which are adapted to be selectively, collectively or in any combination thereof interconnected to the other power source lead $L_1$ by a suitable control means 54, such as a computer, tape or card reader, etc., so as to control the operation of the control device 12 in a manner hereinafter set forth.

Each pneumatically operated actuator 23 can be formed in a like manner and the details of one such pneumatically operated actuator 23 will now be described and reference is made to FIGS. 4, 5 and 6.

Figure 4:
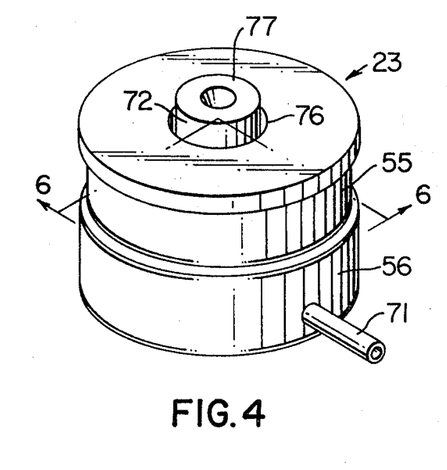
FIG. 4 is a top perspective view of one of the improved pneumatically operated actuators of the apparatus of FIG. 1.
Figure 5:
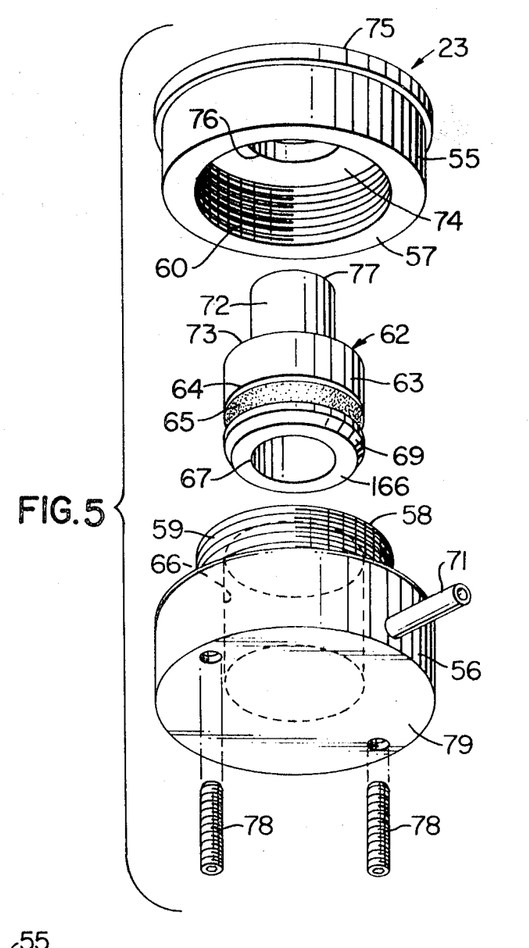
FIG. 5 is an exploded perspective view of the parts forming the pneumatic actuator of FIG. 4.
Figure 6:
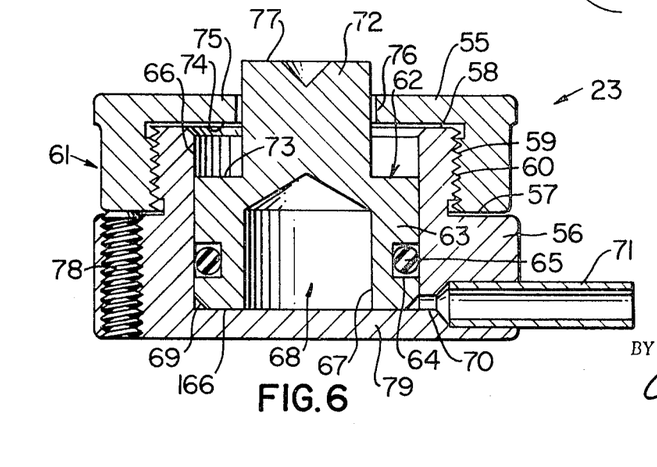
FIG. 6 is a cross-sectional view of the pneumatically operated actuator of FIG. 4 and is taken substantially on line 6—6 of FIG. 4.

As illustrated in FIGS. 4, 5 and 6, the actuator 23 comprises two cup-shaped housing members 55 and 56 formed in cylindrical form and respectively having open ends 57 and 58, the open end 58 of the cup-shaped housing member 56 being inwardly offset and being externally threaded at 59 so as to be threaded to the internal threaded portion 60 of the other cup-shaped housing member 55 whereby the thus-interconnected cup-shaped housing members 55 and 56 define a cylinder means 61 having a transverse cross-sectional configuration closely resembling the transverse cross-sectional configuration of the inside of the cylinder or housing means 15 so as to be disposed in closed relation to the internal peripheral surface of the housing means 15 while permitting movement therebetween for the aforementioned linear expansion and contraction of the positioning unit 24. A piston member 62 has an enlarged cylindrical portion 63 disposed in the open end 58 of the cup-shaped member 56 and has an annular groove 64 receiving an annular O-ring 65 for sealing against the internal peripheral surface 66 of the housing member 56 while permitting axial movement of the piston member 62 relative thereto. The piston member 62 has its lower surface 166 interrupted by a cavity 67 to cooperate with the housing member 56 to define a chamber 68 therebetween.

In addition, the lower surface 166 of the piston member 62 is beveled at 69 at the corner thereof so as to be in fluid communication with a transverse passage means 70 formed radially through the cup-shaped housing member 56 and being interconnected to a tubular insert 71 that is adapted to be interconnected to the respective conduit means 49 of a respective valve means 47 for permitting the pneumatic source 48 to be directed to the cavity 68 of the actuator 23 or for interconnecting the atmosphere thereto.

The piston member 62 includes a reduced portion 72 cooperating with the large portion 63 to define an annular shoulder 73 for abutting against the inside surface 74 of the closed end 75 of the upper cup-shaped housing member 55 so as to limit upward movement of the piston member 62 when the actuator 23 is interconnected to the pneumatic source, the reduced portion 72 of the piston member 62 projecting out through a suitable opening 76 in the closed end 75 of the cup-shaped housing member 55 so as to have its flat end 77 for engaging against the cylinder means 61 of the actuator 23 above the same in the positioning unit 24.

By providing the threaded relation 59 and 60 between the cup-shaped housing members 55 and 56, the stroke or linear distance that the piston member 62 can travel in an upward direction in FIG. 6 when having its cavity 68 interconnected to the pneumatic source 48 can be readily adjusted and once adjusted to the desired position, suitable setscrews 78 can be tightened to hold the cup-shaped housing members 55 and 56 in the desired adjusted threaded relation therebetween.

Therefore, it can be seen that each actuator 23 can have a different stroke setting than the other actuator 23 as determined by the particular threaded relation between the two cup-shaped housing members 55 and 56 thereof which define the cylinder means 61 thereof. Therefore, with pressure applied to the tubing 71 of a particular actuator 23, the piston member 62 moves up until the shoulder 73 thereof strikes against the end 75 of the housing member 55 and when the cavity 68 thereof is interconnected to the atmosphere and a load is applied to the piston member 62 thereof, such as by the tension spring 44 of FIG. 1, the piston 62 is driven downwardly until the same bottoms against the closed end 79 of the lower cup-shaped housing member 56.

Thus, it can be seen that each pneumatically operated actuator 23 of this invention can be formed of relatively simple and inexpensive parts to be assembled together in a simple and effective manner to permit separate adjustment of the stroke thereof and can be disposed in the housing means 15 to provide the positioning unit 24, the housing means 15 having another slot 80 in the side thereof and out through which the tubing 71 of the actuators 23 can project to not only permit axial movement of the actuators 23 in the housing means 15, but also to guide the same in the housing means 15 and prevent rotational movement therein.

The valve means 47 for the apparatus 10 of this invention are identical and one such valve means 47 is illustrated in FIGS. 7–10 and will now be described.

As illustrated in FIGS. 7–10, each valve means 47 comprises a two-piece bracket 81 with the lower part 82 thereof carrying a housing means 83 supporting a solenoid coil 84 having its opposed ends respectively interconnected to the terminals 50 and 51, the coil 84 having core means 85 for attracting an armature or clapper 86 pivotally mounted to the bracket means 81 in any suitable manner at a point 87 intermediate its opposed ends 88 and 89. The armature or clapper 86 is normally urged to the position illustrated in FIG. 8 by a tension spring 90 having one end 91 interconnected to the end 89 of the armature 86 and the other end 92 interconnected to the bracket means 81. An opening 93 passes through the armature 86 and is covered at its lower end by a leaf spring 94 attached to the armature 86 by a pair of eyelets 95 passing through suitable openings in the leaf spring 94 which are oversized so that the leaf spring 94 can bow relative to the armature 86 as will be apparent hereinafter.

Figure 7:
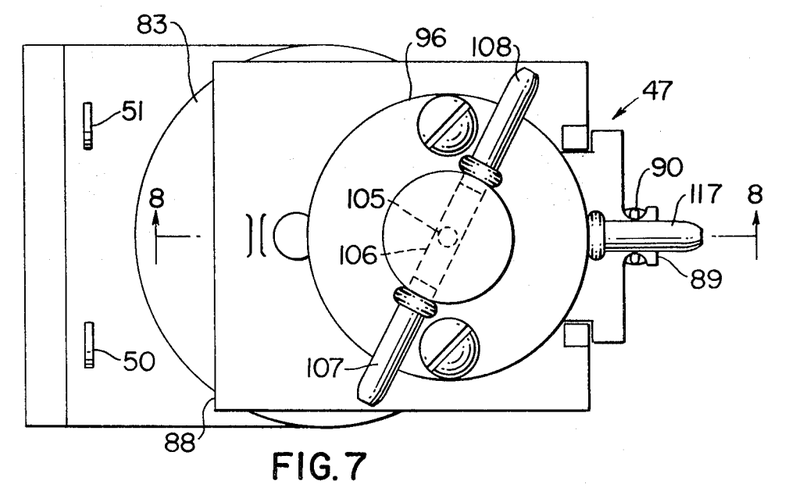
FIG. 7 is a top view of one of the solenoid-operated valve means for the apparatus of FIG. 1.

Another housing member 96 is carried by an upper arm 97 of the bracket means 81 and has a cavity 98 formed therein and receiving a valve seat member 99 that cooperates with an O-ring 100 to seal the cavity 98 above an outwardly directed annular flange 101 of the valve seat member 99 from the exterior of the housing 96. A stepped bore 102 passes through the valve seat member 99 whereby the lower end 103 of the bore 102 is exposed to the atmosphere and the upper end 104 of the bore 102 is in aligned relation with a passage 105 formed in the housing 96 and interconnected to a cross passage 106 formed in the housing 96 and being respectively interconnected at opposed ends to tubular nipple fitting 107 and 108 as illustrated in FIG. 7.

Figure 8:
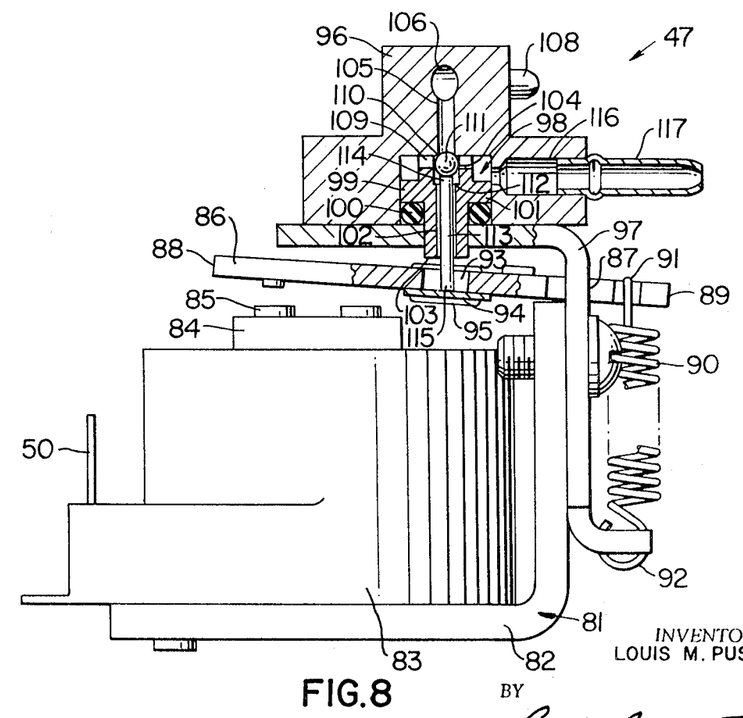
FIG. 8 is a partial cross-sectional view of the solenoid-operated valve of FIG. 7 and is taken on line 8—8 thereof.
Figure 9:
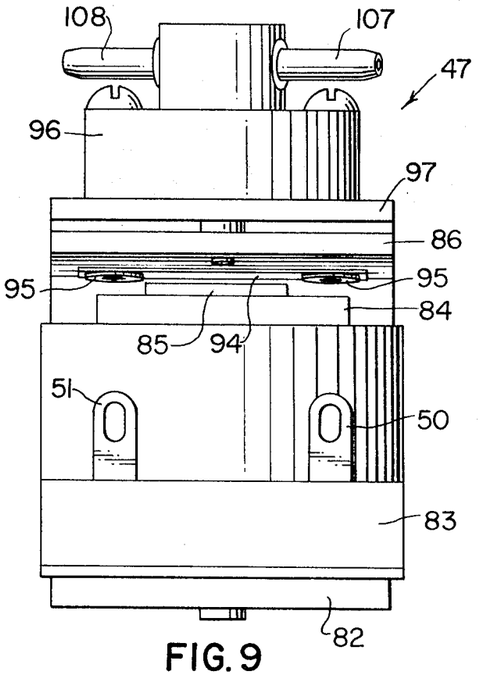
FIG. 9 is a left-hand end view of the solenoid-operated valve of FIG. 8.
Figure 10:
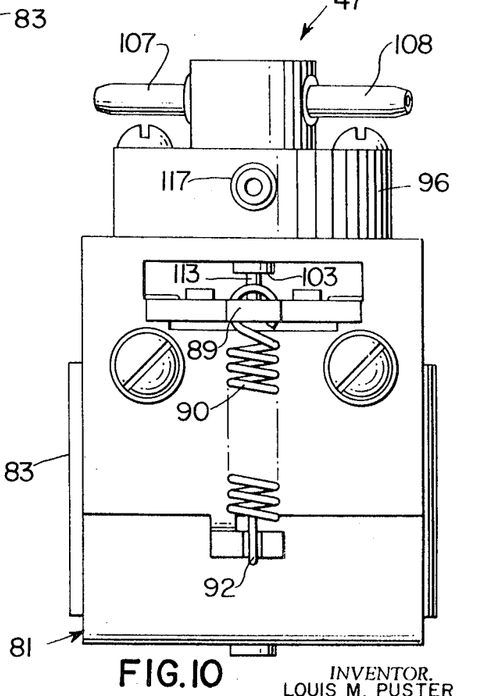
FIG. 10 is a right-hand end view of the solenoid-operated valve of FIG. 8.

The upper end 104 of the stepped bore 102 of the valve sear member 99 is also in communication with a transverse recess 109 that communicates with the cavity 98.

The juncture 110 that the passage 105 makes with the cavity 98 in the housing member 96 defines a valve seat adapted to be opened and closed by a ball valve member 111. Similarly, the stepped bore 102 in the valve seat member 99 defines a valve seat 112 adapted to be opened and closed by the ball valve 111.

An actuating rod 113 projects loosely into the end 103 of the stepped bore 102 so as to have its upper end 114 engageable with the ball valve member 111 and its lower end 115 engageable against the leaf spring 94 of the clapper or armature 86.

Thus, when the coil 84 of the particular valve means 47 is deenergized, the tension spring 90 maintains the armature 86 in the position illustrated in FIG. 8 whereby the armature 86, through the pushrod 113, maintains the ball valve member 111 away from the valve seat 112 and into sealing engagement with the valve seat 110 so that the cavity 98 is directly interconnected to the atmosphere through the cross recess 109 and open valve seat 112. However, when the coil 84 of the particular valve means 47 is energized by being interconnected to the power source leads $L_1$ and $L_2$ by the control device 54, the end 88 of the armature 86 is pulled downwardly in FIG. 8 so that the push rod 113 follows such movement and permits the ball valve member 111 to move away from the valve seat 110 and into sealing engagement with the valve seat 112 whereby the cavity 98 is sealed from the atmosphere and is in fluid communication with the cross passage 106 in the housing means 96.

The cavity 98 of the housing means 96 is always in communication with a passage means 116 which receives a tubular extension nipple 117 that is adapted to be interconnected to the conduit means 49 that leads to the respective actuator 23 for that valve means 47.

As illustrated in FIG. 1, all of the cross passages 106 of the nine valve means 47 are adapted to be interconnected to the pneumatic source 48 by having the nipple extension 107 on the lower valve means 47 of FIG. 1 fluidly interconnected to the pneumatic source 48 by a coupling conduit means 118 and its other nipple extension 108 interconnected to the nipple means 107 of the next adjacent valve means 47 by a coupling conduit means 119. Thus, all of the valve means 47 have the nipple extensions 107 and 108 thereof coupled in series with the uppermost valve means 47 in FIG. 1 having its nipple extension 108 sealed from the atmosphere.

Therefore, in the control system 10 of this invention, when a particular solenoid coil 84 of a particular valve means 47 is energized, the end 88 of the armature clapper 86 thereof is pulled downwardly against the core means 85 and the stem or rod 113 follows such movement and is of sufficient length to permit the ball valve member 111 to seat against the vent valve seat 112 so as to permit pressurized fluid which is supplied through the tubing adapters 107 or 108 to flow seat the passage 106 and opened valve seat 110 to the outlet passage 116 and, thus, to its respective actuator means 23. When that particular solenoid coil 84 is subsequently deenergized, the tension spring 90 snaps the left-hand end 88 of the clapper 86 upwardly so that the stem or rod 113 engages the ball valve member 111 and unseats it from the vent valve seat 112 and forces it against the supply valve seat 110 to close off the supply of air pressure from passage 105 and venting the pressurized air from its interconnected actuator 23 through the open vent valve seat 112 to the atmosphere, such upward snapping movement of the armature 86 permitting the leaf spring 94 to bow and absorb the shock of the valve member 86 striking the stem or rod 86 and its seating action of the ball 111 against the supply valve seat 110.

The operation of the apparatus and control system 10 of this invention will now be described.

With all of the actuators 23 in their deactuated condition, the positioning unit 24 is in the position illustrated in FIG. 1 whereby the actuating rod 13 of the control device 12 is at one setting thereof. However, should it be desired or determined that the output of the control device 12 should be increased or decreased as the case may be, the control means 54 interconnects the power source leads $L_1$ to the particular lead 53 of the particular valve means 47 or to several leads 53 of particular valve means 47 as the case may be so that one or more of the valve means 47 will have the coils 84 thereof energized.

Figure 3:
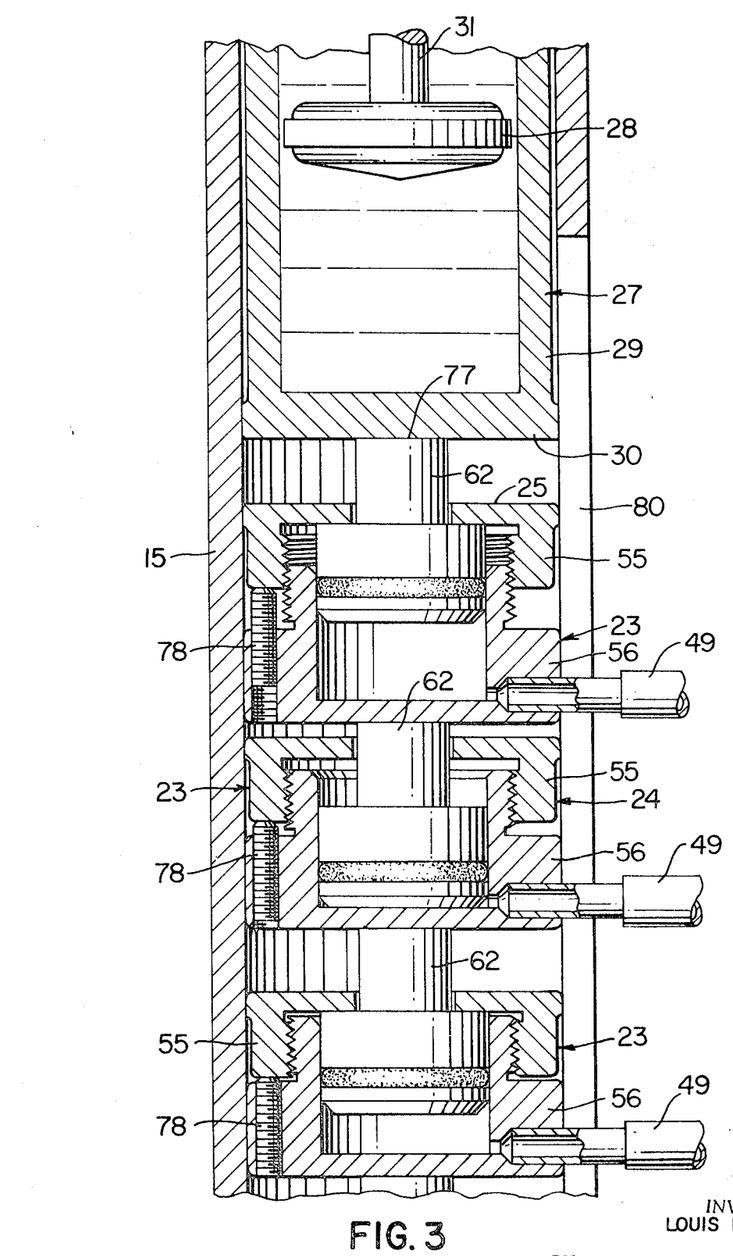
FIG. 3 is an enlarged, fragmentary, cross-sectional view of a portion of the positioning apparatus of FIG. 1 illustrating certain of the pneumatically operated actuators thereof in actuated condition.

Pressurized fluid is then adapted to flow from the source 48 to the respective actuators 23 of the energized valve or valves 47 interconnected therewith. Thus, the pistons 62 of the actuators 23 extend in the manner illustrated in FIG. 3 moving the end 25 of the stack 24 upwardly the amount of the actuated piston strokes. The dashpot cylinder 29 and arm 34 also move up, rotating the lever 37 through the pin 36 in a clockwise movement of the lever 37 through the linkage 38, 39 and 40 move the indicator 14 in a clockwise direction and the actuating rod 13 in an upward direction so as to change the setting of the control device 12 proportionally to the amount of up movement of the end 25 of the positioning unit 24, the dashpot means 27 serving as a dampening device so that the set point of the control device 12 is slowly changed eliminating sudden overshoots and jumping of the control device 12.

If the solenoid valves 47 previously energized are now deenergized, pressurized air is vented from the actuated actuators 23 through their respective deenergized solenoid valves 47 permitting the tension spring 44 to return the extended pistons 62 to their originally collapsed conditions so that the cylinder 29 of the dashpot means 27 moves downwardly permitting the lever 37 to rotate in a counterclockwise direction under the force of the tension spring 41 and move the set point indicator 14 back to its original position and moving the actuator rod 13 back to its original position so that the control device 12 is set back to its original value.

The rate of action of the positioning unit 24 for changing the setting of the control device 12 is determined by the dashpot means 27. This rate of movement in the dashpot means 27 is determined by the viscosity of the fluid in the cylinder 29 and the clearance between the outside diameter of the piston 28 and the inside diameter of the cylinder 29 since the piston 28 is held stationary and the cylinder 29 is moved by spring 44 forcing fluid in the cylinder means 29 past the stationary piston 28.

From the above description, it can be seen that the amount of set point change of the control device 12 is directly proportional to the amount of stroke that the actuators 23 will make when actuated. Therefore, with the nine actuators 23 illustrated, nine different amounts of set point change can be fed into the control device 12. By energizing the solenoid valves in combination and choosing proper strokes for the different actuators 23, almost any set point change to the control device 12 can be achieved. The solenoid valves 47 can be energized by many different devices, such as a computer, tape or card reader, etc.

For example, to fit a computer to the apparatus 10 of this invention, the following description will be based on Binary numbering logic although it is to be understood that other Logic systems could be used such as decimal, Binary decimal, etc.

However, with a binary numbering logic system, the strokes of the nine actuators 23 will be functions of the following binary numbering system: 1, 2, 4, 8, 16, 32, 64, 128 and 256 which totals to 511. Assuming each number represents 1° F., the system 10 can obtain a 0° F. to 511° F. range change in 1° F. steps by choosing the right combination of actuators 23. For example, 200° F. is achieved by actuating the 128° F., 64° F. and the 8° F. actuators 23 while 199° F. is achieved by actuating the 128° F., 64° F., 4° F. 2° F. and 1° F. actuators 23. Actually, each actuator 23 will make a stroke which is some multiple of the above number to obtain more total travel. In this instance, the actuators 23 can be chosen for stroke travel of 0.0025 of an inch per 1° F. Therefore, the 1° F. actuator 23 makes 0.0025-inch travel; the 2° F. actuator 23 makes 0.005-inch travel; the 4° F. actuator 23 makes 0.010-inch travel; the 8° F. actuator 23 makes 0.020-inch travel; the 16° F. actuator 23 makes 0.040-inch travel; the 32° F. actuator 23 makes 0.080-inch travel; the 64° F. actuator 23 makes 0.160-inch travel; the 128° F. actuator 23 makes 0.320-inch travel; and the 256° F. actuator 23 makes 0.640-inch travel.

Therefore, for a total of 511° F. span controller, the stack 24 of actuators 23 would have a total travel of 1.2775 inches in 0.0025-inch steps.

Having available a total of 511° F. span controller, each span less than that could be used; for instance, 200° F. say from 50° F. to 250° F. with 32° F., 16° F., and 2° F. actuators 23 actuated, the set point indicator 14 would be calibrated to read 50° F. To prevent damaging overtravel, stem 31 can be adjusted to bottom out on the inside of the housing or cylinder 29 and serve as a stop for the apparatus 10.

Therefore, it can be seen that not only does this invention provide an improved electrically operated valve means, but also this invention provides an improved system utilizing such valve means or the like.

What is claimed is:

1. Valve construction means comprising a housing means having a pair of opposed valve seats, a valve member carried by said housing means and being movable between said valve seats for opening either one of said valve seats while closing the other valve seat, a plunger movably carried by said housing means and projecting through one of said valve seats to abut said valve member, electrical coil means interconnected to said housing means, and a movable armature means moving to one position when said coil means is deenergized and moving to another position when said coil means is energized, said armature means being operatively interconnected to said housing means and carrying spring means that is continuously engageable with said plunger to move said plunger in substantial unison therewith and thereby move said valve member between its operating positions, said plunger being out of engagement with said valve member when said armature means is in said other position thereof so that said valve member can close one of said valve seats and being in engagement with said valve member when said armature means is in said position thereof so that said valve member can close the other of the valve seats whereby said spring means absorbs shocks between said plunger and said armature means when said armature means is moving from said other position thereof to said one position thereof.

2. Valve construction means as set forth in claim 1 wherein said housing means has a passage means leading from the exterior of said housing means to the space between said valve seats so as to be fluidly interconnected to the particular opened valve seat.

3. Valve construction means as set forth in claim 1 wherein said housing means has a passage means leading from the exterior of said housing means to one of said valve seats, said plunger being loosely disposed in said passage means.

4. Valve construction means as set forth in claim 3 wherein said passage means interconnects the atmosphere with said one valve seat.

5. Valve construction means as set forth in claim 1 wherein said housing means has a passage means leading from the exterior of said housing means to one of said valve seats, said passage means being substantially T-shaped with the cross thereof interconnecting opposed exterior parts of said housing means to said one valve seat at the end of the leg of said T-shaped passage means.

6. Valve construction means as set forth in claim 5 wherein another like housing means and its associated parts are interconnected to the first-named housing means by a conduit means fluidly interconnecting one end of the cross of the T-shaped passage means of the first-named housing means to one end of the cross of the T-shaped passage means of said other housing means.

7. Valve construction means as set forth in claim 1 wherein said spring means comprises a leaf spring, said armature means having an opening therethrough receiving one end of said plunger, said leaf spring spanning said opening and being engaged by said one end of said plunger.

8. Valve construction means as set forth in claim 1 wherein a frame means interconnects said housing means to said coil means, said armature being pivotally mounted to said frame means.

9. Valve construction means as set forth in claim 8 wherein spring means is carried by said frame means and is interconnected to said armature to tend to maintain said armature in said one position thereof.

10. In combination, a pneumatic source, a pneumatically operated actuator, a housing means having a pair of opposed valve seats, first means fluidly interconnecting said source to one of said valve seats, a valve member carried by said housing means and being movable between said valve seats for opening either one of said valve seats while closing the other valve seat, a plunger movably carried by said housing means and projecting through one of said valve seats to abut said valve member, electrical coil means interconnected to said housing means, a movable armature means moving to one position when said coil means is deenergized and moving to another position when said coil means is energized, said armature means being operatively interconnected to said housing means and carrying spring means that is continuously engageable with said plunger to move said plunger in substantial unison therewith and thereby move said valve member between its operating positions, said plunger being out of engagement with said valve member when said armature means is in said other position thereof so that said valve member can close one of said valve seats and being in engagement with said valve member when said armature means is in said one position thereof so that said valve member can close the other of the valve seats whereby said spring means absorbs shocks between said plunger and said armature means when said armature means is moving from said other position thereof to said one position thereof, said housing means having a passage means leading from the exterior of said housing means to the space between said valve seats so as to be fluidly interconnected to the particular opened valve seat, and second means fluidly interconnecting said actuator to said passage means.

11. A combination as set forth in claim 10 wherein said housing means has another passage means leading from the exterior of said housing means to the other of said valve seats, said plunger being loosely disposed in said passage means.

12. A combination as set forth in claim 11 wherein said other passage means interconnects the atmosphere with said other valve seat.

13. A combination as set forth in claim 10 wherein said first means includes a passage means in said housing means leading from the exterior of said housing means to said one valve seat, said passage means being substantially T-shaped with the cross thereof interconnecting opposed exterior parts of said housing means to said one valve seat at the end of the leg of said T-shaped passage means.

14. A combination as set forth in claim 13 wherein another like housing means and its associated parts is interconnected to the first-named housing means by a conduit means fluidly interconnecting one end of the cross of the T-shaped passage means of a first-named housing means to one end of the cross of the T-shaped passage means of said other housing means whereby said source is interconnected to said one valve seat of each housing means.

15. A combination as set forth in claim 10 wherein said spring means comprises a leaf spring, said armature means having an opening therethrough receiving one end of said plunger, said leaf spring spanning said opening and being engaged by said one end of said plunger.

16. A combination as set forth in claim 10 wherein a frame means interconnects said housing means to said coil means, said armature being pivotally mounted to said frame means.

17. A combination as set forth in claim 16 wherein spring means is carried by said frame means and is interconnected to said armature to tend to maintain said armature in said one position thereof.

18. A combination as set forth in claim 10 wherein another like housing means and its associated parts are provided, said first means also fluidly interconnecting said source to the one valve seat of said other housing means.